No. 723,982. PATENTED MAR. 31, 1903.
H. BROOKE.
RECEPTACLE FOR CONTAINING MOLTEN MATERIAL.
APPLICATION FILED FEB. 10, 1898.
NO MODEL. 3 SHEETS—SHEET 1.
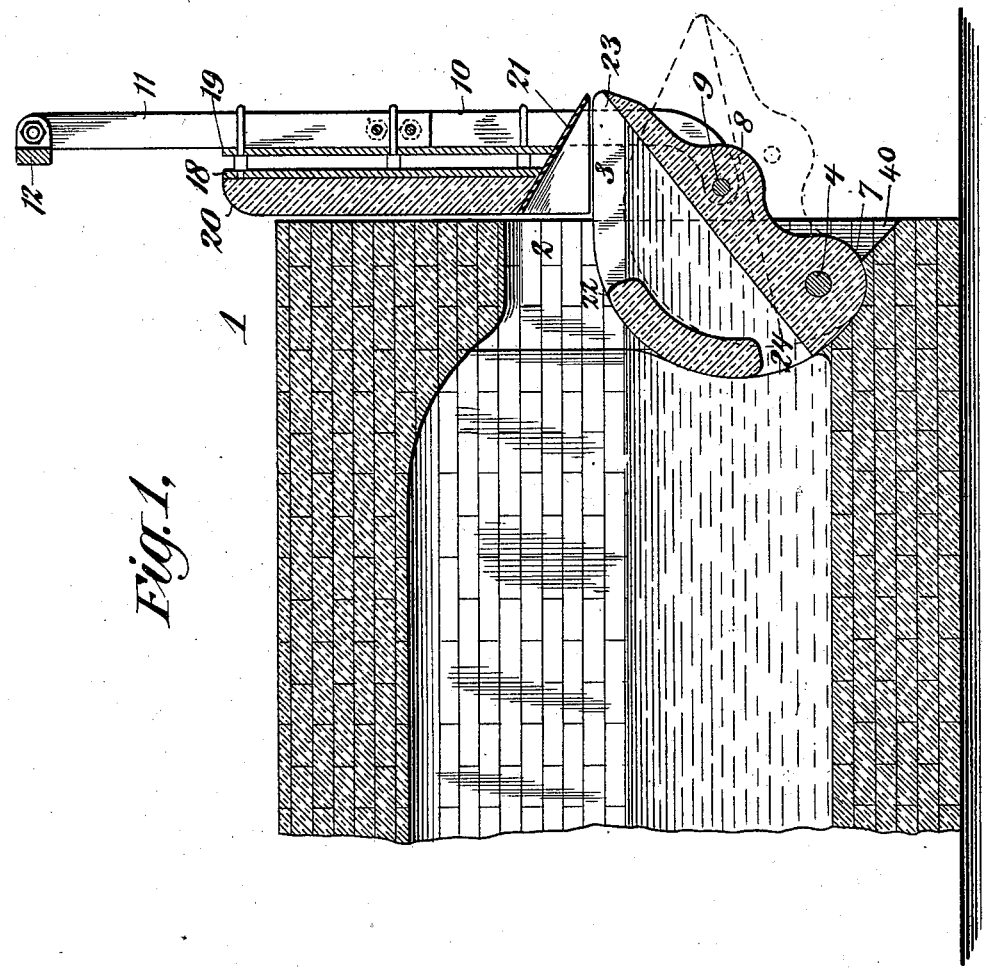
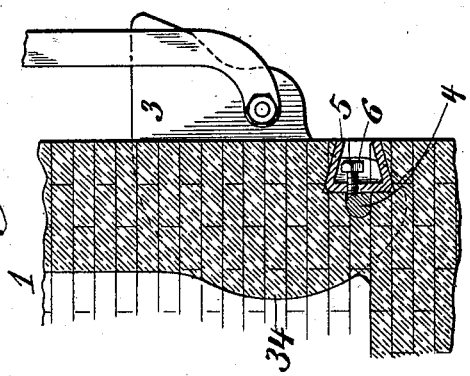
WITNESSES:
INVENTOR
Homer Brooke
BY Ernest Hopkinson
his ATTORNEY

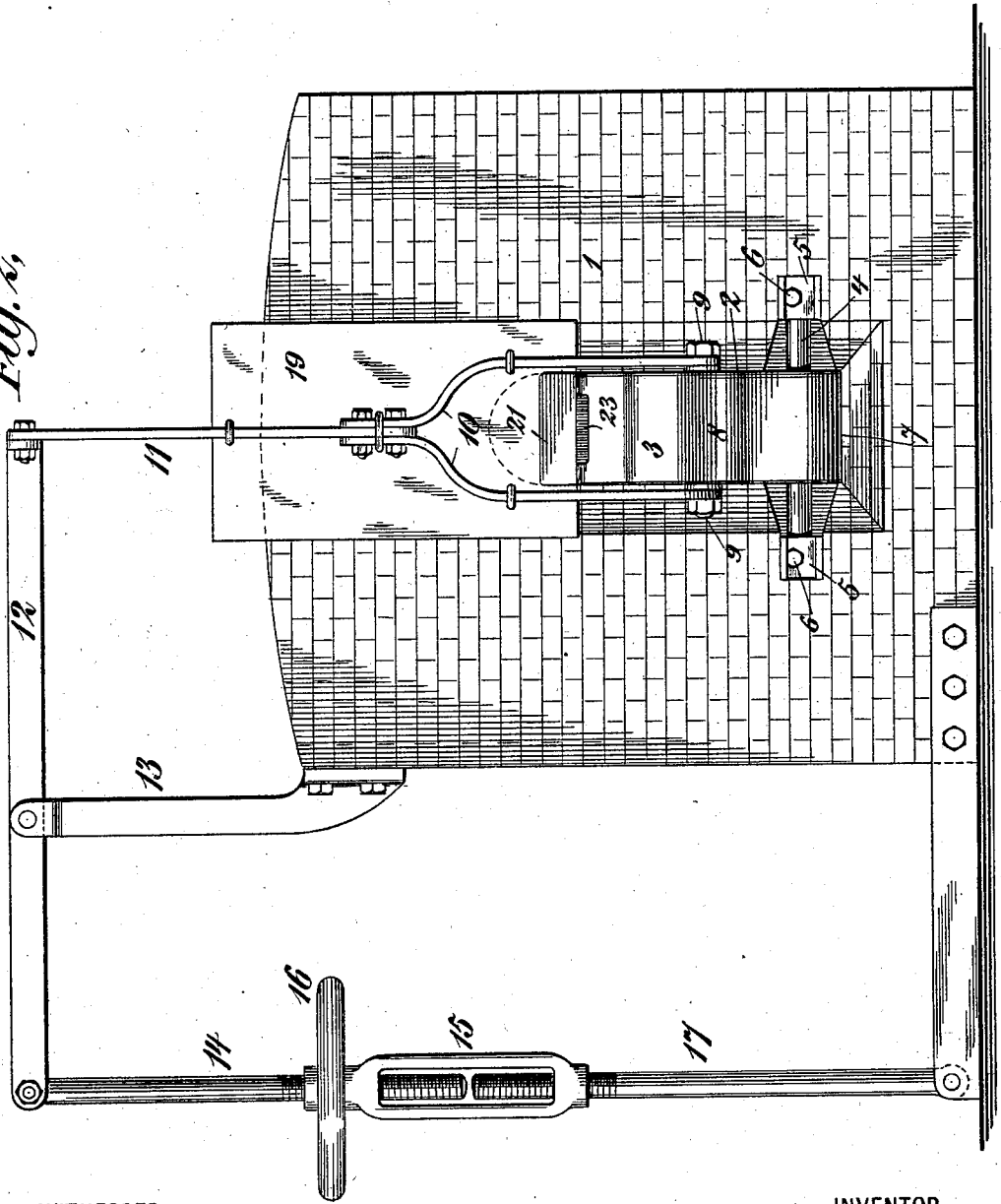

No. 723,982. PATENTED MAR. 31, 1903.
H. BROOKE.
RECEPTACLE FOR CONTAINING MOLTEN MATERIAL.
APPLICATION FILED FEB. 10, 1898.
NO MODEL. 3 SHEETS—SHEET 3.
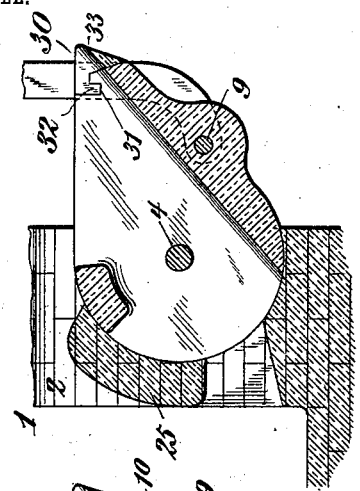
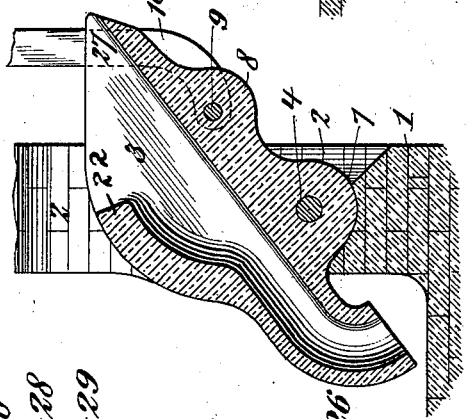
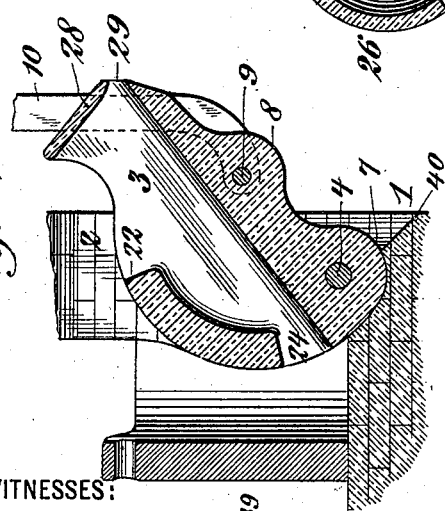
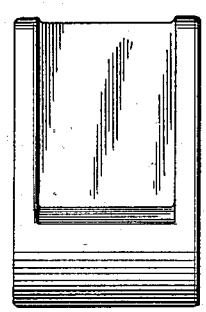
WITNESSES:
D. N. Nayford
E. G. Pratt
INVENTOR
Homer Brooke
BY Ernest Hopkins
his ATTORNEY

UNITED STATES PATENT OFFICE.

HOMER BROOKE, OF JERSEY CITY, NEW JERSEY.

RECEPTACLE FOR CONTAINING MOLTEN MATERIAL.

SPECIFICATION forming part of Letters Patent No. 723,982, dated March 31, 1903.

Application filed February 10, 1898. Serial No. 669,783. (No model.)

*To all whom it may concern:*

Be it known that I, HOMER BROOKE, of Jersey City, county of Hudson, and State of New Jersey, have invented a new and useful Improvement in Receptacles for Containing Molten Material, of which the following is a specification.

The present invention relates to improvements in receptacles for containing molten material; and the principal object of the invention is to provide means for flowing molten material from such receptacles.

While the invention may be applied to receptacles employed for containing any molten material, it is more especially intended to be used in connection with a glass-furnace.

In the drawings I have illustrated a construction embodying my invention, in which—

Figure 1 is a central vertical section of a portion of a glass-furnace with my improvements attached. Fig. 2 is a front elevation of the same. Fig. 3 is a detailed view, partly in section, taken along the line 3 3 of Fig. 2. In Figs. 4, 5, and 6 are illustrated in central vertical section modified forms of my improved pouring-mouth. Fig. 7 is a plan view of the pouring-mouth shown in Fig. 5.

Like numerals of reference refer to like parts throughout the several views of the drawings.

Referring to the drawings in detail, 1 designates a glass-furnace. An opening 2 is suitably located in the side of the furnace, in which opening is placed the pouring mouth or conduit 3. This pouring-mouth is so seated or journaled in the opening of the furnace as to be capable of oscillation to control the flow of the molten glass from the interior of the receptacle to discharge the glass therefrom. This pouring-mouth may be mounted on a shaft seated in suitable bearings in the walls of the furnace or may be provided with trunnions having bearings in said side walls or may be pivotally supported in the opening in any other desired manner. As shown in the drawings, the pouring-mouth is mounted on a shaft 4, which in the construction illustrated in Figs. 1, 2, and 3 has a bearing in the side walls of the furnace and is secured in position by the dovetailed pieces 5, which are provided with the bolts 6, bearing upon the upper sides of the shafts. The opening 2 preferably extends from a point above the surface of the contained molten material to a point coincident or nearly coincident with the bottom of the receptacle, so that the passage in the pouring-mouth may always open, partially or wholly, below the surface of the molten material in the receptacle. The lower portion of the pouring mouth or conduit is made with a semicylindrical or partially curved surface 7, the furnace being provided with a correspondingly-curved part. This shaping of the surface of the two parts is for the purpose of permitting the free movement of the pouring-mouth and also present as narrow an opening as possible, into which the molten glass in the receptacle may enter to form a plastic seal. As the molten glass contained in the receptacle has access to the opposed faces of the pouring-mouth and the sides of the furnace-wall, it is necessary that the seating of the pouring-mouth shall be such as to prevent the molten glass from leaking. It is not to be understood from this that it is essential that the pouring-mouth should fit tightly to the opening formed in the furnace either on the sides or on the seating portion, as a considerable space may be left without any danger of the glass oozing through the interstices, this being prevented by the glass itself cooling on approaching the outside of the furnace and becoming a pasty or viscous mass which acts as a seal, yet at the same time is pliable enough to permit of the easy movement of the pouring-mouth. The discharge-mouth should, however, be so arranged in the opening in the wall of the receptacle that in all the movements of the mouth a seal or packing of the molten material in a partially congealed or plastic condition is made between the outer surfaces of the mouth and the opposed faces of the opening and maintained of substantially uniform thickness throughout all the movements of the mouth.

Passing through a boss 8, formed on the pouring-mouth, is a shaft 9, to which are secured the two branches of a yoke 10, bolted to a connecting-rod 11, which is secured to one end of an arm 12, pivoted to a bracket 13, suitably secured to the wall of the furnace. To the other end of the arm 12 is secured a rod 14, having an end having a left-hand thread engaging a turnbuckle 15, which turnbuckle is provided with an operating-wheel 16. A rod 17, provided with a right-hand thread, engages the other end of the turnbuckle. These are the means I have shown for raising and lowering the pouring-mouth; but it will be evident that other forms of mechanism might be availed of for this purpose.

Suitably secured to the rod 11 is a heat-shield consisting of plates 18 and 19, separated by an air-space. To the plate 18 is attached a piece of fire-brick 20 or other material refractory to heat. The lower portion of the shield is provided with a hood 21, extending out from the side of the furnace and overhanging the projecting lip of the pouring-mouth. By these means it will be seen that when the pouring-mouth is lowered the hood 21 and the shield coact and direct the heat down from the interior of the furnace upon the pouring-mouth to maintain hot the pouring-mouth and the molten glass passing through.

As to the form and characteristics of the pouring-mouth, it may be stated that the same may vary in many details of construction; but the best results are obtained from a pouring mouth or conduit which affords a comparatively unobstructed flow of the molten glass at a point intermediate the surface and the bottom, the glass in the middle being free from the scum and deleterious matter which may be found on the surface and on the bottom. To attain this object of drawing the molten glass from the desired point, several means may be utilized. For instance, in Figs. 1, 4, and 5 I have shown a bridge 22, which closes the pouring-mouth from its uppermost point to a point near the bottom of the channel 23, leaving an opening 24, through which the glass is drawn. In Fig. 6 this bridge is formed in the furnace itself instead of in the conduit, this bridge being designated by the numeral 25.

In Fig. 5 I have illustrated a form of pouring-mouth which is provided with a tailpiece 26 in the form of a tube. In this form of pouring-mouth a siphoning effect is obtained by reason of the turned-down end of the tailpiece 26. Also the form illustrated in this figure is provided with a wide flat lip 27 for the purpose of discharging the molten glass in approximately sheet form.

In Fig. 4 I have shown the end of the pouring-mouth as provided with a hood 28, thus forming a partially-closed end to the pouring-mouth provided with an aperture 29, through which the molten glass issues. Of course it will be apparent that this aperture may be of any desired shape, approximating the shape of the finished article of glass, if desired.

In Fig. 6 I have shown a form of pouring-mouth having a detachable end. This end may be of any suitable material, preferably soapstone, carbon, or platinum, and secured to the pouring-mouth in any desired manner, the means shown in the drawings consisting of a recess 31, formed in the pouring-mouth, into which fits a tongue 32, formed on the detachable lip. The under side of the lip in this form, as well as in all the other forms, is cut away at 33, so as to present a sharp edge over which the glass flows to prevent the glass from adhering or following the under side of the lip when it is being discharged.

In order to protect the pouring-mouth as much as possible from the deleterious action of the heat of the molten glass and the interior of the furnace, I provide on the wall of the interior of the furnace two cheeks 34, projecting into the molten glass and protecting the sides of the pouring-mouth, so that only the end thereof is subjected to the heat of the interior of the furnace.

In Fig. 4 I have shown a dam 39, which it may be found desirable to use when taking out or replacing a pouring-mouth while the furnace or receptacle contains the molten glass. For this purpose the dam may be secured to the upper portion of the interior of the receptacle, so as to be lowered into the molten glass when it is desired to take out the pouring-mouth and put another in position. This dam may be of any desired form, but, as shown in the drawings, is of a semicylindrical form. For the purpose of easily permitting of the withdrawal and placing in position of the pouring-mouth, I have shown the opening in the furnace in which the pouring-mouth is seated as cut away or beveled at 40.

What is claimed as new is—

1. A receptacle for containing molten material provided with an opening in its side wall, and a discharge-mouth located in said opening and movable therein, the said mouth being provided with a passage which when the mouth is moved into discharging position permits the continuous flow of molten material from the receptacle therethrough and being arranged in such relation to said opening in the receptacle that a seal or packing of the contents of the receptacle in a partially congealed or plastic condition is made between the outer surfaces of the said mouth and the opposed faces of the said opening and maintained of substantially uniform thickness throughout all the movements of the mouth.

2. A receptacle for containing molten material provided with an opening in its side wall, and a discharge-mouth located in said opening and movable therein from a non-discharging to a discharging position, said discharge-mouth being provided with a longitudinally-rounded under surface coacting with a correspondingly-curved portion with which the receptacle is provided, and with a continuous passage which, when the mouth is in discharging position, permits the continuous flow of molten material from the body of the receptacle.

3. A receptacle for containing molten material provided with an opening in its side wall, and a discharge-mouth journaled in said opening and having a longitudinally-rounded under surface coacting with a correspondingly-curved portion with which the receptacle is provided, said discharge-mouth being located and movable in said opening and having a passage through it, which, when the mouth is in discharging position, permits the continuous flow of molten material from the body of the receptacle through said mouth.

4. A receptacle for containing molten material provided with an opening in its side wall, and a discharge-mouth provided with a longitudinally-rounded under surface located and movable in said opening, which latter is provided with a rounded surface opposed and corresponding to the rounded under surface of the discharge-mouth, said discharge-mouth having a passage which, when in discharge position, permits the continuous flow of molten material from the body of the receptacle.

5. A receptacle for containing molten material, provided with an opening in its side wall, a discharge-mouth journaled in said opening, said discharge-mouth being provided with a passage which, when the mouth is in discharge position, permits the continuous flow of molten material from the body of the receptacle, and a bridge-piece extending across the rear portion only of said passage.

6. A receptacle for containing molten material provided with an opening in its side wall, a discharge-mouth journaled in said opening, and a hood deflecting heat directly into the discharge end of said mouth.

7. The combination with a receptacle for containing molten material, of an oscillating mouth provided with a removable lip, and means for moving said mouth to control the flow of molten material therethrough.

8. The combination with a receptacle for containing molten material having an opening formed in its side wall, of a discharge-mouth located therein, a bridge extending across said opening, the lower edge of the bridge being below the level of the top of the mouth, and means for moving said mouth to control the flow of molten material therethrough.

9. The combination with a receptacle for containing molten material provided with an opening in its side wall, of an oscillating mouth in said opening, means for moving the same to control the flow of molten material therethrough, and cheeks formed on the side walls of the receptacle to protect from the action of heat the portion of the mouth extending into the interior of the receptacle.

10. The combination with a receptacle for containing molten material, of an oscillating mouth, means for moving the same, and a shield secured to said means and moving therewith.

11. The combination with a receptacle for containing molten material, of an oscillating mouth, means for moving the same, a shield on the outside of said opening, and a heat-deflector secured to said shield and projecting over the outwardly-extending portion of the oscillating mouth.

12. The combination with a receptacle for containing molten material having an opening formed in its side wall, an oscillating mouth located in said opening and journaled therein, and dovetailed pieces securing the journals in position, substantially as specified.

In testimony whereof I have signed my name to this specification in the presence of two subscribing witnesses.

HOMER BROOKE.

Witnesses:
E. G. PRATT,
SEABURY C. MASTICK.